United States Patent [19]

Takeo et al.

[11] Patent Number: 4,751,282
[45] Date of Patent: Jun. 14, 1988

[54] STAR BLOCK POLYOL LACTAM COPOLYMER AND PROCESS FOR THE PRODUCTION THEREOF

[75] Inventors: Saegusa Takeo, Kyoto; Jiro Horikawa, Ehime; Masahiro Niwano, Ehime; Takenobu Kanazawa, Ehime, all of Japan

[73] Assignee: Sumitomo Chemical Company, Limited, Osaka, Japan

[21] Appl. No.: 920,010

[22] Filed: Oct. 17, 1986

Related U.S. Application Data

[60] Division of Ser. No. 763,089, Aug. 6, 1985, Pat. No. 4,650,608, which is a continuation-in-part of Ser. No. 686,518, Dec. 16, 1984, abandoned.

[30] Foreign Application Priority Data

Dec. 26, 1983 [JP] Japan ................................ 58-252093
Dec. 26, 1983 [JP] Japan ................................ 58-252094

[51] Int. Cl.$^4$ ............................................. C08G 69/14
[52] U.S. Cl. .................................... 528/323; 528/312; 528/319
[58] Field of Search ........................ 528/323, 312, 319

[56] References Cited

U.S. PATENT DOCUMENTS 4,650,608  3/1987  Takeo et al. ........................ 528/323

Primary Examiner—Harold D. Anderson

Attorney, Agent, or Firm—Sughrue, Mion, Zinn, Macpeak, and Seas

[57] ABSTRACT

A novel star block copolymer represented by the general formula as shown below and a process for the production thereof are described. The copolymer has superior physical properties, particularly impact strength and, furthermore, is reduced in coloration. Thus the copolymer can find numerous uses; for example, it can be used in preparation of fibers, foams, automotive parts, and electrical components. The copolymer is produced by copolymerizing a star-shaped polyether prepolymer and a lactam, said prepolymer being prepared by reacting a star-shaped polyoxyalkylene having at least 3 terminal hydroxy groups and an N-chlorocarbonyl lactam, in the presence of an anionic polymerization catalyst.

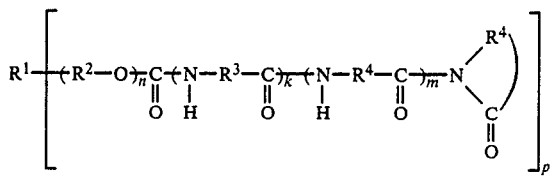

In this formula, all the symbols are as defined hereinbefore.

6 Claims, No Drawings

STAR BLOCK POLYOL LACTAM COPOLYMER AND PROCESS FOR THE PRODUCTION THEREOF

CROSS REFERENCE TO RELATED APPLICATION

This is a division of application Ser. No. 763,089, filed 8/6/85, now U.S. Pat. No. 4,650,608, which is a continuation-in-part of application Ser. No. 686,518, filed 12/16/84, now abandoned.

FIELD OF THE INVENTION

The present invention relates to a star block copolymer of high impact resistance and a process for the production thereof. More particularly, it is concerned with a star block copolymer comprising a star-shaped polyether moiety and a polyamide moiety, resulting from anionic polymerizatin of a lactam in the presence of a polyether prepolymer comprising a star-shaped polyoxyalkylene as a main ingredient, and a process for producing the star block copolymer.

BACKGROUND OF THE INVENTION

Methods of producing a polyether-polyamide block copolymer containing a polyoxyalkylene polymer moiety and a polylactam polymer moiety by means of anionic polymerization in the presence of an anionic polymerization catalyst are described in, for example, Japanese Patent Publication No. 40,120/79 and U.S. Pat. Nos. 3,862,262, 4,031,164, 4,034,015 and 4,223,112; these patents indicate that said block copolymer can be used for textile fibers, foams, furnitures and automotive parts because of its excellent properties. However, one of the main disadvantages of the polyether-polamide block copolymer obtained by the method of the patents shown above is that the copolymer is colored yellow, and because of this defect, colorless products cannot be obtained, and even when it is desirable to give certain colors to products, only dull colors are obtained.

Moreover, since the above methods use a bifunctional acyllactam compound as a chain extender, when a star-shaped polyoxyalkylene containing at least 3 hydroxy groups in the molecule is reacted with such a chain extender, the network structure results and a desired star block copolymer cannot be produced.

German Patent Application (OLS) No. 1,909,577 describes that anionic polymerization of a lactam can be effected using as an activator an ester of a lactam-N-carboxylic acid and a di- or polyol compound represented by the formula:

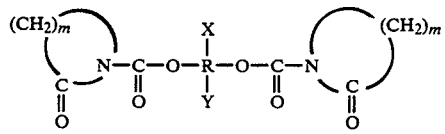

wherein R is an aliphatic group having 2 to 12 carbon atoms, and m is an integer of 2 to 12, and X and Y are each a hydrogen atom or a residual group of

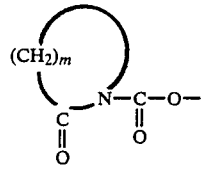

However, the object of said patent is to produce a polyamide by homopolymerization of a lactam, but not to produce a star block copolymer of a star-shaped polyoxyalkylene and a polyamide, as in the case of the present invention.

SUMMARY OF THE INVENTION

An object of the present invention is to provide a novel star block copolymer having excellent mechanical properties and good hue.

Another object of the present invention is to provide a process for producing the star block copolymer.

The present invention relates to:

(1) a star block copolymer represented by the following general formula:

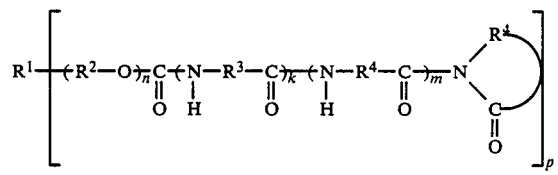

wherein $R^1$ is a polyhydric (trihydric or more) alcohol residual group or a polyvalent amino compound residual group (having at least 3 hydrogen atoms linked to the nitrogen atom thereof); $R^2$, $R^3$ and $R^4$ are each an aliphatic hydrocarbon residual group; m and n are each a natural number; k is 1 to 0; and p is an integer of 3 or more; and (2) a process for producing the above-defined star block copolymer which comprises copolymerizing a star-shaped polyether prepolymer and a lactam, said prepolymer being prepared by reacting a star-shaped polyoxyalkylene having at least 3 terminal hydroxy groups and an N-chlorocarbonyl lactam, in the presence of an anionic polymerization catalyst.

DETAILED DESCRIPTION OF THE INVENTION

The star-shaped polyether prepolymer as used herein has the following general formula:

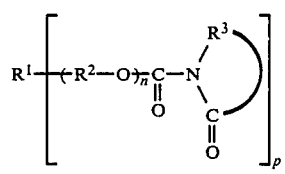

wherein $R^1$, $R^2$, $R^3$, n, and p are the same as defined above, and is prepared by reacting a star-shaped polyoxyalkylene having at least 3 terminal hydroxy groups and an N-chlorocarbonyl lactam.

The star-shaped polyoxyalkylene having at least 3 terminal hydroxy groups used in the present invention is a polyol having at least 3 hydroxy groups in the molecule as represented by the following general formula:

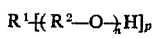

wherein $R^1$, $R^2$, n and p are the same as defined above.

In this formula, $R^2$ is a hydrocarbon residual group having preferably from 2 to 6 carbon atoms and more preferably from 2 to 4 carbon atoms. Examples are —CH$_2$—CH$_2$—,

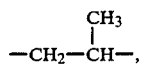

—CH$_2$—CH$_2$—CH$_2$—,  —CH$_2$—CH$_2$—CH$_2$—CH$_2$—, and

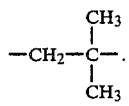

Two or more different hydrocarbon residual groups may be present in the molecule.

The polyhydric alcohol residual group represented by $R^1$ is a residual group resulting from polyhydric alcohols having at least 3 hydroxy groups, such as trimethylolethane, trimethylolpropane, pentaerythritol, glycerine, butanetriol, erythritol, adonitol, arabitol, xylitol, sorbitol, galactitol, mannitol, and sorbitan.

The polyvalent amino compound residual group represented by $R^1$ is a residual group resulting from polyvalent amino compounds containing at least 3 hydrogen atoms in the molecule in the form of —NH$_2$ or <NH, such as ethylenediamine, propylenediamine, hexamethylenediamine, diethylenetriamine, toluenediamine, and phenylenediamine.

The star-shaped polyoxyalkylene having at least 3 terminal hydroxy groups can be obtained by alkaline ring-opening or cationic ring-opening polymerization of a cyclic ether with a polyhydric alcohol and a polyvalent amino compound containing at least 3 hydrogen atoms linked to the nitrogen atom thereof.

Examples of the cyclic ether include ethylene oxide, propylene oxide, isobutylene oxide, oxetane, and tetrahydrofuran. The alkaline ring opening polymerization can be carried out by known procedures such as by the use of an alkali metal or its hydroxide or hydride as a catalyst.

In this ring-opening polymerization, only one cyclic ether may be used, or two or more cyclic ethers may be random copolymerized. In addition, two or more cyclic ethers may be polymerized succesively to form block copolymers.

The star-shaped polyoxyalkylene employed in the present invention preferably has a number average molecular weight of 300 to 50,000 and more preferably 500 to 20,000. When the number average molecular weight is less than 300, sufficient mechanical properties, particularly high impact strength, are not obtained in the finally resulting star block copolymer. On the other hand, when the number average molecular weight exceeds 50,000, the concentration of the terminal hydroxy groups in the star-shaped polyoxyalkylene is so low that the anionic block polymerization fails to go to completion.

The number of branches in the star-shaped polyoxyalkylene, i.e., p, is an integer of 3 or more. If it is less than 3, the polyoxyalkylene is not in the star-shaped form and its terminal activity is not sufficiently high.

The symbol n indicating a number of —(R$^2$—O)— units in each branch of the star-shaped polyoxyalkylene is a natural number having a distribution. It may vary in branches, provided that its total number in all branches is preferably from 7 to 1,000.

The N-chlorocarbonyl lactam used in the present invention is represented by the formula:

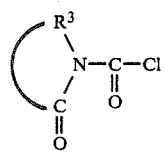

wherein $R^3$ is an aliphatic hydrocarbon residual group having 3 to 12 carbon atoms, such as —(CH$_2$)$_3$—, —(CH$_2$)$_5$—, and —(CH$_2$)$_{11}$—.

Preferred examples are N-chlorocarbonyl caprolactam, N-chlorocarbonyl pyrrolidinone; N-chlorocarbonyl valerolactam, and N-chlorocarbonyl laurolactam.

The N-chlorocarbonyl lactam is usually prepared by reacting a lactim ether and phosgene in the presence of a tertiary amine, followed by treatment with hydrogen chloride gas (see *Die Makromolekulare Chemie*, 127, 34–53 (1969)).

The reaction for obtaining the star-shaped polyether prepolymer according to the present invention, i.e., the reaction of a star-shaped polyoxyalkylene having two terminal hydroxy groups with an N-chlorocarbonyl lactam, takes place by the following scheme:

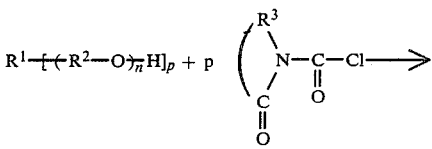

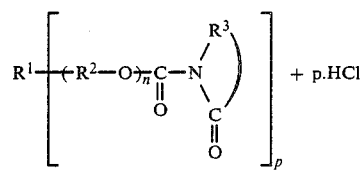

In some cases, dimerized and trimerized prepolymers as shown below are formed as by-products in small amounts.

Dimerized Prepolymer:

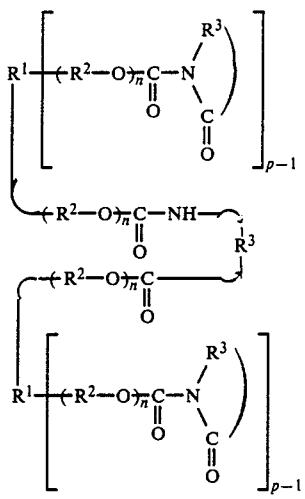

Trimerized Prepolymer:

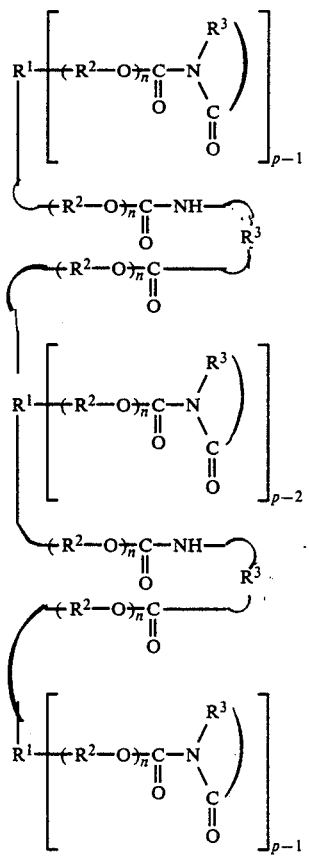

The reason why the star-shaped polyether prepolymer is prepared from an N-chlorocarbonyl lactam resides in that the acid chloride group of the N-chlorocarbonyl lactam reacts with the hydroxy group more readily than the lactam group.

In cases that bifunctional compounds known as activators for anionic polymerization of lactams, such as bisacyl lactam compounds, diisocyanate compounds, bisacid chloride compounds, and phosgene, which all react also with a hydroxy group, are used in place of the N-chlorocarbonyl lactam, the desired star-shaped polyether prepolymer is not formed. This is because the reactivities of the two functional groups of the compounds to the hydroxy group are equal to each other; that is, after one functional group of the compound reacts with the hydroxy group of the star-shaped polyoxyalkylene, the possibility of the other functional group reacting with the hydroxy group of another star-shaped polyoxyalkylene is nearly equal to that of another unreacted bifunctional activator reacting with the hydroxy group of the star-shaped polyoxyalkylene and, therefore, the network structure is formed, resulting in the production of insoluble gelled products. This is an undesirable condition for block polymerization of lactam.

That is, it is only when an N-chlorocarbonyl lactam is used that the desired star-shaped polyether prepolymer can be prepared.

In preparing the star-shaped polyether prepolymer, the star-shaped poloxyalkylene containing at least 3 terminal hydroxy groups and the N-chlorocarbonyl lactam are compounded in such a ratio that the N-chlorocarbonyl lactam is from 0.7 to 1.5 equivalents, preferably from 0.9 to 1.2 equivalents, per equivalent of the hydroxy group in the star-shaped polyoxyalkylene. If the N-chlorocarbonyl lactam is less than 0.7 equivalent per equivalent of the hydroxy group in the star-shaped polyoxyalkylene, the anionic polymerization of the lactam cannot be achieved, or the polymerization time is undesirably prolonged. On the other hand, if it is in excess of 1.5 equivalents, large amounts of lactam homopolymers are formed in the anionic polymerization of lactam and there can be formed only a star-shaped polyether prepolymer having undesirable physical properties.

The reaction of the star-shaped polyoxyalkylene having at least 3 terminal hydroxy groups with the N-chlorocarbonyl lactam is preferably carried out at 0° to 200° C., and more preferably at 10° to 160° C.

At temperatures lower than 0° C., the reaction proceeds at an extremely slow rate, and at temperatures higher than 200° C., an undesirable decomposition reaction takes place.

The reaction for obtaining the polyether prepolymer shown above can be conducted in the presence or absence of a solvent or a dehydrochlorinating agent. Exemplary solvents used in this reaction are methylene chloride, chloroform, carbon tetrachloride, tetrahydrofuran, dioxane, acetone, methyl ethyl ketone, cyclohexanone, dimethyl sulfoxide, dimethyl cellosolve, diglyme, benzene, toluene, xylene, and carbon disulfide. Exemplary dehydrochlorinating agents are tertiary amines such as triethylamine, pyridine, dimethylaniline and diethylaniline. However, it is the least expensive to conduct this reaction in the absence of both the solvent and dehydrochlorinating agent.

Organometallic compound may be added as catalysts at the last stage of the reaction since they are effective in completing the reaction.

Organometallic compounds which can be used for this purpose are metal salts of lactam, such as caprolactam magnesium chloride, caprolactam magnesium bromide, caprolactam magnesium iodide, pyrrolidinone magnesium bromide, piperidone magnesium bromide, sodium caprolactam, lithium caprolactam, and potassium caprolactam.

The thus-prepared star-shaped polyether prepolymer is often a liquid having substantially the same viscosity as the starting material star-shaped polyoxyalkylene.

The star-shaped polyether prepolymer according to the present invention is mixed with a lactam and an anionic polymerization catalyst, and subjected to the anionic block polymerization process. Materials having an active functional group other than the star-shaped polyether prepolymer can also be used in this process. For example, compounds which are known as activators for anionic copolymerization of lactams, such as acyllactam compounds, isocyanate compounds, acid halide compounds, and N-(alkoxycarbonyl) lactam compounds, and prepolymers such as polyoxyalkylene having two terminal hydroxy groups can be used to obtain molded products having various physical properties.

Anionic block copolymerization of the above-prepared star-shaped polyether prepolymer and the lactam proceeds as shown below, resulting in the formation of a star block copolymer.

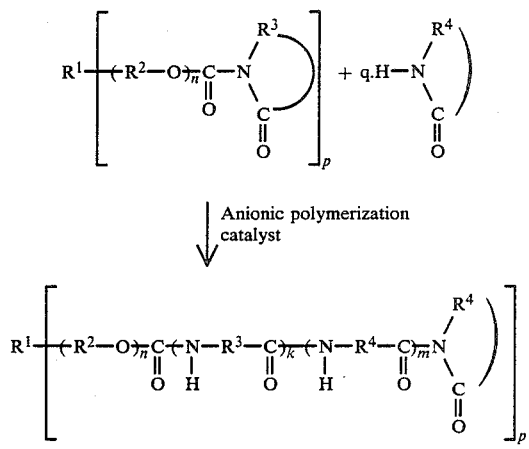

In the above equation, m is a natural number having a distribution and may vary in all branches; $R^4$ is an aliphatic hydrocarbon residual group having from 3 to 12 carbon atoms; k is 0 or 1 and may vary in all branches; and q is a value of m×p. Examples of $R^4$ are —(CH$_2$)$_3$—, —(CH$_2$)$_5$—, and —(CH$_2$)$_{11}$—.

A specific method of copolymerizing the thus synthesized star-shaped polyether prepolymer and the lactam is as follows:

The star-shaped polyether prepolymer, lactam and anionic polymerization catalyst are mixed at the lowest possible temperature which is not lower than the melting point of the lactam. At temperatures lower than the melting point of the lactam, sufficient mixing cannot be ensured; on the other hand, excessively high temperatures are undesirable because polymerization reaction takes place during the mixing. The polymerization reaction is carried out either at an elevated temperature or by pouring the mixture into a heated container or mold. The polymerization temperature differs depending upon the kind of the lactam used, but is usually within the range of about 50° to 200° C. For example, when ε-caprolactam is used as the lactam, the temperature for mixing the star-shaped polyether prepolymer, ε-caprolactam and anionic polymerization catalyst is preferably 68° to 100° C., and the polymerization temperature is preferably 100° to 200° C. At temperatures lower than 100° C., polymerization is not easily carried out, and at temperatures higher than 200° C., the obtained block copolymer assumes an undesirably distinct color.

This polymerization reaction is completd very quickly within about one hour.

In the block copolymerization according to the present invention, the amount of the star-shaped polyether prepolymer is 2 to 90 wt%, preferably 10 to 80 wt%, based on the total amount of the star-shaped polyether prepolymer, lactam and anionic polymerization catalyst. When the amount of the star-shaped polyether prepolymer is less than 2 wt%, the obtained star block copolymer does not have sufficient impact resistance, and when the amount of the prepolymer exceeds 90 wt%, the strength of the copolymer decreases to an undesirably low level.

Examples of the lactam used in the present invention include pyrrolidinone, piperidinone, ε-caprolactam, valerolactam, and laurolactam, among which ε-caprolactam is the most preferred.

The amount of the lactam is 5 to 97%, preferably 15 to 89.7 wt%, based on the total amount of the star-shaped polyether prepolymer, lactam and anionic polymerization catalyst.

The anionic polymerization catalyst employed in the method of the present invention can be any of catalysts that are generally used for anionic polymerization of lactams. They include all elemental alkali metals or alkaline earth metals; or hydrides, halohydrides, alkoxides, oxides, hydroxides, amides and carbonates thereof; and alkyl metals, alkyl metal halides, lactam metals, and lactam metal halides. Exemplary compounds are sodium hydroxide, potassium hydroxide, lithium oxide, ethylmagnesium bromide, phenylmagnesium bromide, calcium fluorohydride, strontium carbonate, barium hydroxide, methylsodium, butyllithium, phenylpotassium diphenylbarium, sodium amide, diethylmagnesium, magnesium methoxide, caprolactam magnesium bromide, caprolactam magnesium iodide and caprolactam sodium. The amount of the anionic polymerization catalyst is 0.1 to 10 wt%, preferably 0.3 to 6 wt%, based on the total amount of the star-shaped polyether prepolymer, lactam and anionic polymerization catalyst. When the catalyst is less than 0.1 wt%, the anionic block copolymerization fails to go to completion, and when the catalyst exceeds 10 wt%, the obtained star block copolymer has an undesirably low strength.

The star block copolymer synthesized using the polyether prepolymer according to the present invention has, as already mentioned, high impact-resistance and heat-resistant properties, and a block copolymer produced with a larger amount of the polyether prepolymer can also be used as an elastomer. Thus, the block copolymer according to the present invention is applicable to many end uses, e.g., fibers, foams, automotive parts and electrical components. The copolymer can be made into the usual forms for molding resins (e.g., pellets), and subsequently molded into various shapes by injection molding, extrusion molding or other molding methods. It can also be formed into large-sized products, such as furnitures and automotive parts, by polymerizing the starting materials directly in a mold. The copolymer can also be put to various uses after modification by pigments, dyes, fibers, flame retardants, fillers, plasticizers, stabilizers or other additives.

The present invention is now described in detail by reference to the following examples, which should not be interpreted to limit the scope of the present invention in any manner.

The measurement of physical properties in the Examples was made in accordance with ASTM D2240 (Shore hardness), JIS K7110 (Izod impact strength) and JIS K7203 (flexural modulus). The degree of color staining (yellow index) was measured in accordance with JIS K7103. Further, GPC (gel permeation chromatograph) analysis was made with an apparatus of WATERS Co., using an RI detector. The column assembly was composed of Microstyragel columns ($10^4$, $10^3$, 500 and $10^2$ Å) connected in series, and the measurement was made at a flow rate of 2 ml/min using THF (tetrahydrofuran) as a carrier.

PREPARATION EXAMPLE

In this example, star-shaped polypropylene glycols used in Examples 1 to 7 were prepared.

A mixture of 31 g of glycerine, 16 g of a 50% by weight aqueous solution of potassium hydroxide, and 300 g of toluene was placed in an autoclave. The water was first removed by azeotropy with toluene, and then the toluene was removed.

To the residue was gradually added 802 g of propylene oxide in a nitrogen gas atmosphere while cooling so as to maintain the temperature within the range of from 105° to 110° C. Then the mixture was reacted for an additional 3 hours at 105° to 110° C.

The reaction product was neutralized with diluted sulfuric acid and then washed several times with distilled water to obtain 820 g of polypropylene glycol having an average molecular weight of 2,500.

The above procedure was repeated using polyhydric alcohols as shown in Table 1 to produce the corresponding polypropylene glycols.

obtained viscous liquid was filtered and vacuum dried at 80° C. over one day and night to thereby yeild a star-shaped polyether prepolymer in the amount as shown in Table 2.

The nitrogen content of the star-shaped polyether prepolymer was measured as shown in Table 2.

The obtained polyether prepolymer was analyzed with a 90 MHz proton nuclear magnetic resonance apparatus (Hitachi, Ltd., Model R-40) in deutero chloroform with tetramethylsilane as the reference material, and the following protons were observed:

H(c) proton of the methyl group of polypropylene glycol at $\delta 1.1$–$1.2$ ppm, H(e, f, g) protons of the terminal oxycarbonyl caprolactam group at 1.74 ppm, H(h) proton of the terminal oxycarbonyl caprolactam group at $\delta 2.6$–$2.75$ ppm, H(a, b) protons of polypropylene glycol at $\delta 3.3$–$3.7$ ppm, H(d) proton of the terminal oxycarbonyl caprolactam group at $\delta 3.76$–$3.9$ ppm, and H(i) proton bonded to a tertiary carbon adjacent to the terminal oxycarbonyl lactam group at $\delta 4.9$–$5.2$ ppm.

H(d, e, f, g, h) protons were in substantial agreement with the corresponding peaks of the nuclear magnetic resonance spectrum of N-(isopropoxycarbonyl) caprolactam. H(a, b, c, d, e, f, g, h) protons are indicated in the following formula:

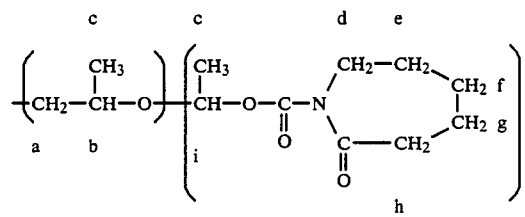

TABLE 1

| Polyhydric Alcohol | | Amount of Propylene Oxide (g) | Polypropylene Glycol | | Example No. in which Propylene Glycol is used |
|---|---|---|---|---|---|
| Type | Amount (g) | | Amount (g) | Average Molecular Weight | |
| Glycerine | 31 | 802 | 820 | 2500 | Example 1 |
| Trimethylolpropane | 44.7 | 955.3 | 986 | 3000 | Examples 2, 6 and 7 |
| Pentaerythritol | 27.2 | 972.8 | 988 | 5000 | Example 3 |
| Pentaerythritol | 34 | 891 | 910 | 3700 | Example 4 |
| Sorbitol | 22.8 | 977 | 982 | 8000 | Example 5 |

EXAMPLES 1 TO 5

A 200-ml round flask equipped with a stirrer, the atmosphere of which had been replaced by nitrogen, was charged with 100 g of each of the star-shaped polypropylene glycols as shown in Table 2 and triethylamine of the amount as shown in Table 2. Subsequently, an N-chlorocarbonyl caprolactam was added in an amount as shown in Table 2 while stirring at 30° C., and they were then reacted for 5 hours.

The reaction mixture in an emulsified form was mixed and washed with 400 ml of a 2% by weight aqueous solution of sodium hydrogencarbonate, and the resulting oil layer was separated. Then 200 ml of methylene chloride was added thereto and dissolved in the oil layer and, further removal of the queous layer by separation, the methylene chloride soluton was dehydrated by adding anhydrous sodium sulfate. The methylene chloride was distilled away from the methylene chloride solution by means of an evaporator. The thus- The number of the terminal oxycarbonyl caprolactams in this star-shaped polyether prepolymer as calculated from the integration of this nuclear magnetic resonance spectrum is shown in Table 2.

The molecular weight distribution of the star-shaped polyether prepolymer was determined by GPC. As a result, a chromatogram showing a single-peaked molecular weight distribution which was substantially the same as that of the starting polypropylene glycol was obtained.

Caprolactam magnesium iodide (1.0 g) and $\epsilon$-caprolactam (37.5 g) were mixed and dissolved. The resulting mixture was further blended with the star-shaped polyether prepolymer (11.5 g) at 80° C., and the obtained product was poured into a mold heated to 160° L C. A resin sheet was obtained in each experiment after a certain time (for specific setting times, see Table 3). Various properties of the resin sheet are indicated in Table 3.

TABLE 2

| Example No. | Star-Shaped Polypropylene Glycol | | | Amount of Triethyl-amine (g) | Amount of N—Chloro-carbonyl Caprolactam (g) | Yield of Star-Shaped Polyether Prepolymer (g) | Nitrogen Analysis | | Number of Terminal Oxycarbonyl Caprolactams as determined by NMR Analysis |
|---|---|---|---|---|---|---|---|---|---|
| | Starting Material | Number of Hydroxy Groups per Molecule | Number Average Molecular Weight | | | | Calculated (%) | Found (%) | |
| 1 | Glycerine | 3 | 2500 | 13.3 | 23.2 | 108 | 1.4 | 1.4 | 3.1 |
| 2 | Trimethyl-olpropane | 3 | 3000 | 11.1 | 19.3 | 105 | 1.2 | 1.2 | 3.2 |
| 3 | Pentaery-thritol | 4 | 5000 | 8.9 | 15.5 | 104 | 1.1 | 1.0 | 4.1 |
| 4 | Pentaery-thritol | 4 | 3700 | 12.0 | 20.9 | 109 | 1.3 | 1.3 | 4.0 |
| 5 | Sorbitol | 6 | 8000 | 8.3 | 14.5 | 106 | 1.0 | 0.95 | 6.3 |

TABLE 3

| Example No. | Solidi-fication Time (sec) | Physical Properties (23° C., 50% RH) | | | |
|---|---|---|---|---|---|
| | | Hardness (Shore D) | Notched Izod Impact Strength (kg · cm/cm) | Flexural Modulus (kg/cm$^2$) | Yellow Index |
| 1 | 50 | 71 | 83.3 | 10200 | 0.5 |
| 2 | 60 | 70 | 87.5 | 10200 | 0.3 |
| 3 | 75 | 70 | 78.9 | 9600 | 0.3 |
| 4 | 65 | 71 | 88.1 | 9900 | 0.8 |
| 5 | 80 | 70 | 72.5 | 9400 | 0.6 |

EXAMPLES 6 TO 10

A 200-ml round flask equipped with a stirrer, the atmosphere of which had been replaced by nitrogen, was charged with 100 g of each of the star-shaped polypropylene glycols as shown in Table 4 and N-chlorocarbonyl caprolactam of the amount as shown in Table 4. They were reacted at 80° C. for 10 hours and then further reacted at 100° C. for 5 hours while evacuating by means of a vacuum pump through an alkali stripping column. As a result, a liquid star-shaped polyether prepolymer was produced in the yield shown in Table 4.

The obtained star-shaped polyether prepolymer (30 g) was washed three times with a two-phase (methylene chloride and water) solvent at a temperature lower than 10° C., and the methylene chloride layer was separated. After the methylene chloride was distilled off, the residue was vacuum-dried at 70° C. for 48 hours to obtain a sample for analysis. The sample was analyzed for the nitrogen content, the results of which are shown in Table 4.

This samle was analyzed with a 90 MHz proton nuclear magnetic resonance apparatus (Hitachi, Ltd., Model R-40) in deutero chloroform with tetramethylsilane as the reference material. As a result, the following protons were observed:

H(c) proton of the methyl group of polypropylene glycol at δ1.1–1.2 ppm, H(e, f, g) protons of the terminal oxycarbonyl cprolactam group at δ1.74 ppm, H(h) proton of the terminal oxycabonyl caprolactam group at δ2.6–2.75 ppm, H(a, b) protons of polypropylene glycol at δ3.3–3.7 ppm, H(d) proton of the terminal oxycarbonyl caprolactam group at δ3.76–3.9 ppm, and H(i) proton bonded to a tertiary carbon adjacent to the terminal oxycarbonyl caprolactam at δ4.9–5.2 ppm.

H(d, e, f, g, h, i) protons were in substantial agreement with the corresponding peaks of the nuclear magnetic resonance spectrum of N-(isopropoxycarbonyl) caprolactam. H(a, b, c, d, e, f, g, h) protons are identified in the following formula:

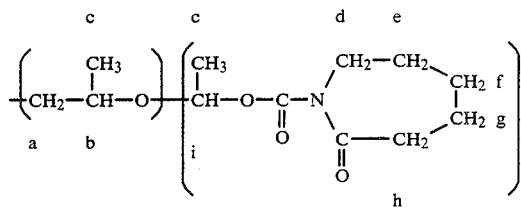

The number of the terminal oxycarbonyl caprolactams in this star-shaped polyether prepolymer as calculated from the integration of this nuclear magnetic resonance spectrum is shown in Table 4.

The molecular weight distribution of the star-shaped polyether prepolymer was determined by GPC. As a result, a chromatogram having two peaks (one large and the other small) was obtained. The larger peak indicates a molecular weight distribution which was substantially the same as that of the starting polypropylene glycol. The smaller peak corresponded to a molecular weight about twice that of the larger peak and was presumably the peak for a dimerized prepolymer. The smaller peak was about 10% to 30% in size of the larger peak.

TABLE 4

| Example No. | Polypropylene Glycol | | | Amount of N—Chloro-carbonyl Caprolactum (g) | Yield of Star-Shaped Polyether Prepolymer (g) | Nitrogen Analysis | | Number of Terminal Oxycarbonyl Caprolactams as determined by NMR Analysis |
|---|---|---|---|---|---|---|---|---|
| | Starting Material | Number of Hydroxy Groups per Molecule | Number Average Molecular Weight | | | Calculated (%) | Found (%) | |
| 6 | Glycerine | 3 | 2500 | 21.2 | 114 | 1.4 | 1.4 | 3.1 |
| 7 | Trimethyl-olpropane | 3 | 3000 | 17.7 | 113 | 1.3 | 1.2 | 3.0 |
| 8 | Penta-erythritol | 4 | 5000 | 14.1 | 109 | 1.0 | 1.0 | 3.8 |
| 9 | Penta-erythritol | 4 | 3700 | 19.0 | 113 | 1.2 | 1.3 | 4.1 |
| 10 | Sorbitol | 6 | 8000 | 13.8 | 109 | 1.0 | 0.95 | 6.2 |

Anionic block copolymerization of the thus-produced star-shaped polyether prepolymer was conducted as follows.

Caprolactam magnesium bromide (1.5 g) and ε-caprolactam (33.5 g) were mixed and dissolved. The resulting mixture was further blended with the star-shaped polyether prepolymer (15 g) at 70° C., and the obtained product was poured into a mold heated to 140° C. A resin sheet was obtained in each experiment after a certain time (for specific setting times, see Table 5). Various properties of the resin sheet are indicated in Table 5.

NMR analysis of the star-shaped polyether prepolymer was conducted in the same manner as in Examples 1 to 5. The analytical results were the same as in Examples 1 to 5.

The number of terminal oxycarbonyl caprolactams was calculated based on the integral value of the NMR spectrum, and the results are shown in Table 6.

TABLE 6

| Example No. | Tertiary Amine Type | Amount (g) | Yield (g) | Nitrogen Analysis Found (g) | Nitrogen Analysis Calculated (%) | Number of Terminal Oxycarbonyl Lactams as determined by NMR Analysis |
| --- | --- | --- | --- | --- | --- | --- |
| 11 | Triethylamine | 10.4 | 101 | 1.3 | $1.2^3$ | 3.0 |
| 12 | N,N—Dimethyl-aniline | 12.4 | 103 | 1.3 | $1.2^3$ | 2.9 |

TABLE 5

| Example No. | Setting Time (sec) | Physical Properties Hardness (Shore D) | Notched Izod Impact Strength (kg · cm/cm) |
| --- | --- | --- | --- |
| 6 | 60 | 64 | 89.5 |
| 7 | 75 | 65 | 110.7 |
| 8 | 95 | 65 | 117.2 |
| 9 | 70 | 64 | 106.3 |
| 10 | 100 | 66 | 126.0 |

EXAMPLES 11 AND 12

A 200-ml round flask equipped with a stirrer, the atmosphere of which had been replaced by nitrogen, was charged with 100 g of a triol-type star-shaped polypropylene glycol (number average molecular weight: 3,000) derived from trimethylolpropane and a tertiary amine (with the type and amount being shown in Table 6). Subsequently, 18 g of N-chlorocarbonyl caprolactam was added dropwise while stirring the mixture at 30° C. After the dropwise addition was completed, they were further reacted at 50° C. for 5 hours.

The reaction mixture was washed twice with a methylene chloride/diluted hydrochloric acid aqueous solution (0.05N) two-phase solvent at a temperature below 10° C. and further three times with a methylene chloride/water two-phase solvent at a temperature below 10° C. The methylene chloride layer was separated, and the methylene chloride was removed from the methylene chloride layer by distillation. The residue was vacuum dried at 70° C. for 10 hours and further dried at 100° C. for 3 hours while introducing nitrogen.

The yield of the thus-produced star-shaped polyether prepolymer is shown in Table 6.

The nitrogen content of the star-shaped polyether prepolymer was analyzed by the Kjeldahl method, and the results are shown in Table 6.

Anionic block copolymerization of the above-produced star-shaped polyether prepolymer was conducted as follows.

Caprolactam magnesium bromide (1.5 g) and ε-caprolactam (33.5 g) were mixed and dissolved. The resulting mixture was further blended with the star-shaped polyether prepolymer at 70° C., and the obtained product was poured into a mold heated to 140° C. A resin sheet was obtained in each experiment after a certain time (for specific setting times, see Table 7). Various properties of the resin sheet are indicated in Table 7.

TABLE 7

| Example No. | Setting Time (sec) | Physical Properties Hardness (Shore D) | Notched Izod Impact Strength (kg · cm/cm) |
| --- | --- | --- | --- |
| 11 | 105 | 64 | 98.6 |
| 12 | 110 | 64 | 96.2 |

EXAMPLES 13 TO 16

Five hundred grams of triol-type star-shaped polypropylene glycol (Wako Pure Chemical Industries, Ltd., number average molecular weight: 2,000) derived from trimethylolpropane and N-chlorocarbonyl caprolactam (88 g) were charged in a nitrogen-purged one-liter round flask equipped qith a stirrer. The reaction was allowed to proceed at 80° C. for 7 hours, and for an additional 5 hours at 100° C., while reducing the pressure with a vacuum pump connected to an alkali stripping column. A star-shaped polyether prepolymer in a liquid form was thus obtained in a yield of 549 g.

Caprolactam magnesium bromide (1.5 g) was mixed with and dissolved in ε-caprolactam of the amount shown in Table 8, which was then mixed with the above-prepared star-shaped polyether prepolymer at 70° C. The resulting mixture was poured into a mold heated to 140° C. The setting time was changed as shown in Table 8. There was thus obtained a resin sheet reduced in coloration. Physical properties of the resin sheet are shown in Table 8.

TABLE 8

| Example No. | ε-Caprolactam (g) | Star-Shaped Polyether Prepolymer (g) | Setting Time (sec) | Physical Properties Hardness (Shore D) | Notched Izod Impact Strength (kg · cm/cm) |
| --- | --- | --- | --- | --- | --- |
| 13 | 43.5 | 5 | 600 | 81 | 11.3 |
| 14 | 38.5 | 10 | 110 | 74 | 24.4 |

TABLE 8-continued

| Example No. | ε-Caprolactam (g) | Star-Shaped Polyether Prepolymer (g) | Setting Time (sec) | Physical Properties | |
|---|---|---|---|---|---|
| | | | | Hardness (Shore D) | Notched Izod Impact Strength (kg · cm/cm) |
| 15 | 33.5 | 15 | 70 | 65 | 110.5 |
| 16 | 23.5 | 25 | 30 | 25 | not bent |

EXAMPLES 17 TO 19

An anionic polymerization catalyst with the type and amount being shown in Table 9 was mixed with and dissolved in ε-caprolactam of the amount shown in Table 9. The resulting mixture was deaerated and then mixed with 15 g of the star-shaped polyether prepolymer produced in Example 13 at 80° C. The mixture was poured into a mold heated to 140° C. The setting time was changed as shown in Table 9. There was thus obtained a resin sheet reduced in coloration. Physical properties of the resin sheet are shown in Table 9.

TABLE 9

| Example No. | Anionic Polymerization Catalyst | | ε-Caprolactam (g) | Setting Time (sec) | Physical Properties | |
|---|---|---|---|---|---|---|
| | Type | Amount (g) | | | Hardness (Shore D) | Notched Izod Impact Strength (kg · cm/cm) |
| 17 | Ethylmagnesium bromide | 0.9 | 34.1 | 80 | 64 | 98.5 |
| 18 | Sodium Caprolactam | 1.0 | 34.0 | 120 | 65 | 86.0 |
| 19 | Phenylmagnesium bromide | 1.4 | 33.6 | 90 | 64 | 89.2 |

EXAMPLE 20 TO 23

A 500-ml round flask equipped with a stirrer, the atmosphere of which had been replaced by nitrogen, was charged with 250 g of polypropylene glycol (a triol type having a number average molecular weight of 2,980, made by Wako Pure Chemical Industries, Ltd.) and 37 g of N-chlorocarbonyl caprolactam. The reaction was allowed to proceed at 70° C. for 6 hours, and for an additional 5 hours at 100° C., while reducing the pressure with a vacuum pump connected to an alkali stripping column. A polyether prepolymer having a terminal oxycarbonyl caprolactam group was thus obtained in a yield of 278 g.

As an anionic polymerization catalyst, caprolactam magnesium iodide and caprolactam magnesium bromide of the amounts shown in Table 10 were mixed with and dissolvd in 37.8 g of ε-caprolactam. This mixed solution was further mixed with 11.2 g of the above prepared polyether prepolymer having a terminal oxycarbonyl caprolactam group at 75° C., and the resulting mixture was poured into a mold heated to 170° C. The setting time was changed as shown in Table 10. There was thus obtained a resin sheet reduced in coloration. Physical properties of the resin sheet are shown in Table 10.

TABLE 10

| Example No. | Caprolactam Magnesium Iodide (g) | Caprolactam Magnesium Bromide (g) | Setting Time (sec) | Physical Properties | |
|---|---|---|---|---|---|
| | | | | Hardness (Shore D) | Notched Izod Impact Strength (kg · cm/cm) |
| 20 | 1 | — | 50 | 70 | 77.1 |
| 21 | 0.5 | 0.5 | 67 | 70 | 76.8 |
| 22 | 0.25 | 0.75 | 80 | 70 | 75.5 |
| 23 | — | 1 | 200 | 71 | 51.8 |

While the invention has been described in detail and with reference to specific embodiments thereof, it will be apparent to one skilled in the art that various changes and modifications can be made therein without departing from the spirit and scope thereof.

What is claimed is:

1. A star block copolymer represented by the following general formula:

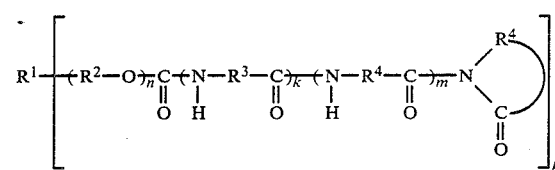

wherein $R^1$ is a residual group derived from; trimethylolethane, trimethylolpropane, pentaerythritol, glycerine, butanetriol, erythritol, adonitol, arabitol, xylitol, sorbitol, galactitol, mannitol, or sorbitan; $R^2$, $R^3$ and $R^4$ are each an aliphatic hydrocarbon residual group; m and n are each a natural number; k is 1 or 0; and p is an integer of 3 or more.

2. A star block copolymer according to claim 1, wherein $R^2$ is —$CH_2$—$CH_2$—, $$-CH_2-\underset{\underset{CH_3}{|}}{CH}-,$$

—$CH_2$—$CH_2$—$CH_2$—, —$CH_2$—$CH_2$—$CH_2$—$CH_2$—, or

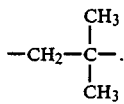

3. A star block copolymer according to claim 1, wherein $R^3$ is $-(CH_2)_3-$, $-(CH_2)_5-$, or $-(CH_2)_{11}-$.

4. A star block copolymer according to claim 1, wherein $R^4$ is $-(CH_2)_3-$, $-(CH_2)_5-$, or $-(CH_2)_{11}-$.

5. A process for producing a star block copolymer represented by the following general formula:

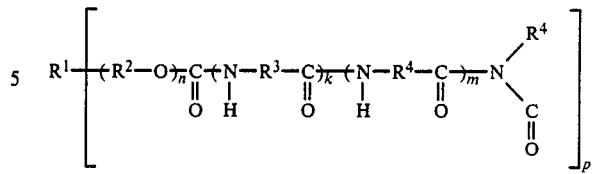

wherein $R^1$ is a residual group derived from trimethylolethane, trimethylolpropane, pentaerythritol, glycerine, butanetriol, erythritol, adonitol, arabitol, xylitol, sorbitol, galactitol, mannitol, or sorbitan; $R^2$, $R^3$ and $R^4$ are each an aliphatic hydrocarbon residual group; m and n are each a natural number; k is 1 or 0; and p is an integer of 3 or more, which process comprises copolymerizing a star-shaped polyether prepolymer and a lactam, said prepolymer being prepared by reacting a star-shaped polyoxyalkylene having at least 3 terminal hydroxy groups and an N-chlorocarbonyl lactam, in the presence of an anionic polymerization catalyst.

6. A process according to claim 5, wherein said anionic polymerization catalyst is caprolactam magnesium iodide.

* * * * *